United States Patent [19]

Shinmoto

[11] 3,924,841
[45] Dec. 9, 1975

[54] EXTRUSION MOULDING MACHINE

[76] Inventor: Jitsumi Shinmoto, 16-4 Koyama 4-chome, Shinaga, Tokyo, Japan

[22] Filed: Nov. 30, 1973

[21] Appl. No.: 420,700

[30] Foreign Application Priority Data

Dec. 7, 1972  Japan.............................. 47-122029

[52] U.S. Cl. ............... 259/191; 198/213; 425/208; 425/378
[51] Int. Cl.² ......................................... A23C 1/06
[58] Field of Search ........... 198/213, 217; 425/208, 425/378; 259/191, 192, 193

[56] References Cited
UNITED STATES PATENTS

| | | | |
|---|---|---|---|
| 1,423,698 | 7/1922 | Thurston............................ | 198/213 |
| 2,437,460 | 3/1948 | Francisci......................... | 198/217 X |
| 3,487,503 | 1/1970 | Barr et al........................... | 425/208 |
| 3,503,944 | 3/1970 | Wisseroth et al.............. | 425/208 X |
| 3,547,261 | 12/1970 | Koch............................... | 198/213 X |
| 3,751,015 | 8/1973 | Hensen et al...................... | 259/191 |
| 3,785,760 | 1/1974 | Johnson............................. | 425/378 |

*Primary Examiner*—Evon C. Blunk
*Assistant Examiner*—Douglas D. Watts
*Attorney, Agent, or Firm*—Spensley, Horn and Lubitz

[57] ABSTRACT

An extrusion moulding machine comprising a cylindrical housing having input and output ports and a tapered feed screw mounted within the cylindrical housing and rotatably supported at each end. The feed screw tapers from the input port to the output port of the cylindrical housing. Furthermore, the feed screw comprises two counter-rotating helical threads meeting at the output port.

7 Claims, 8 Drawing Figures

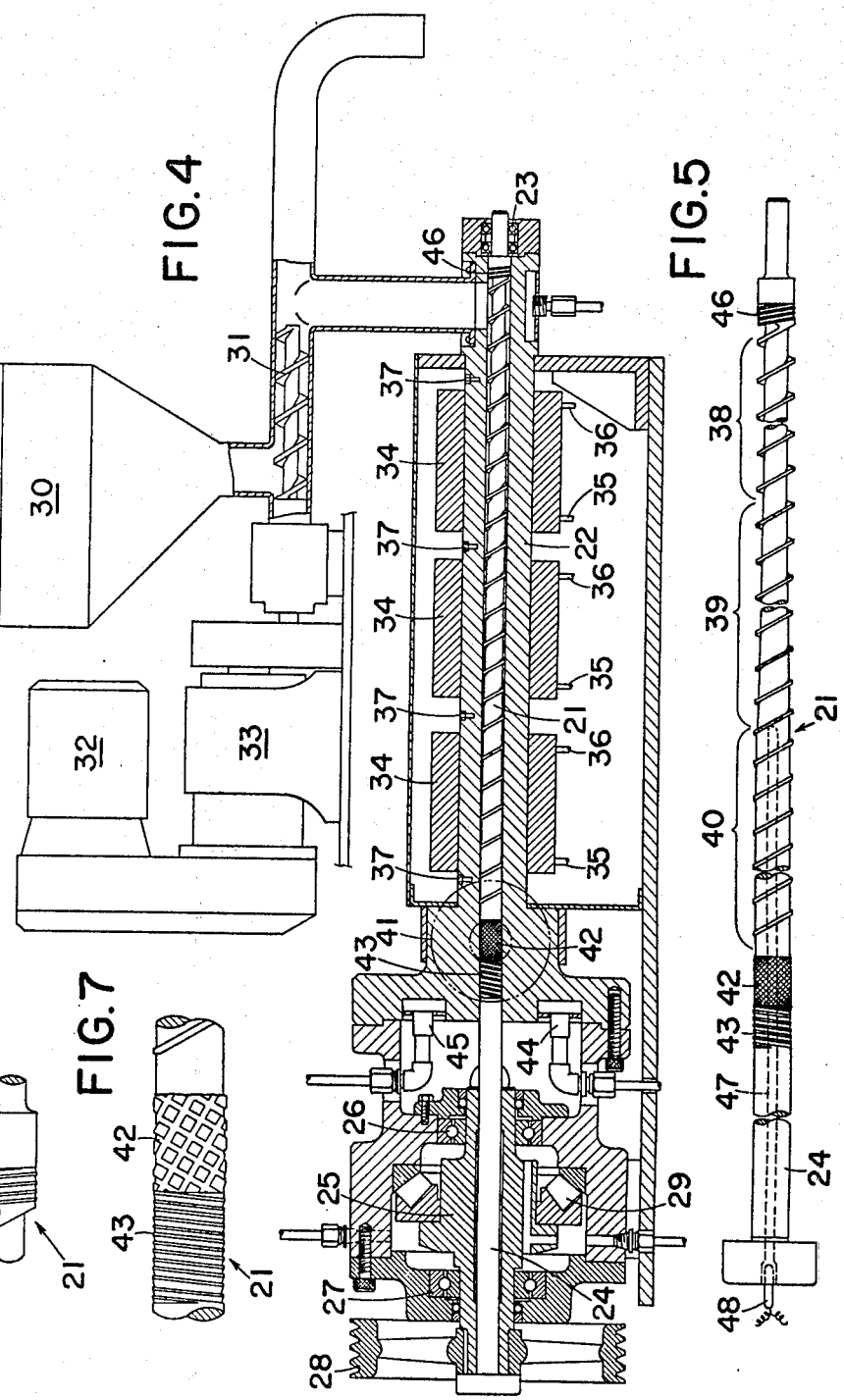

EXTRUSION MOULDING MACHINE

This invention relates to extrusion moulding machines and more particularly to extruders for melting or plasticizing resin or resinous compound for moulding.

In the extrusion moulding operation, resin or resinous compound is fed from a hopper and thence to a screw conveyor of an extruder where the resin or compound is heated by a heater or by internal friction, whereupon theemolten or plasticized resin emerges from a die. As is well known in the art, there is provided, between a barrel of the extruder and the screw, three sections, i.e., a solid phase section or a feed zone, a phase transition section or a compression zone and a liquid phase section or a metering zone. These sections or zones are formed by changing the root diameter of the screw. The least root diameter is set at the first section or the feed zone. In a conventional extruder such as exemplified in FIG. 1, a screw 10 extends through a barrel 11 and is rotatably supported as a cantilevered shaft at an end portion 12 where the root diameter is reduced to a minimum. Torque is given to the screw 10 from this radially reduced portion 12. A long cantilevered screw has a tendency, when it is rotated within a cylinder or barrel, to wobble at its free end and cause the screw thread to "bite" on the surface of the internal wall of the barrel. When a cantilevered screw is driven to rotate form the radially reduced portion where the material strength is less, there is the possibility of being twisted off at this point during the rotation. Thus, the conventional screw 10 had to be driven through a reduction gear. When a screw of, for example, 35 mm. in diameter is used, the standard rate of extrusion is set about 12 kg. at 100 r.p.m. The running of the screw at low speed is liable to create an unevenness in the rate of supply of material which unevenness is due to the pumping action of a low speed screw conveyor.

Then a vertical type of extruder was proposed for use, such as illustrated in FIG. 2, where an upright screw 13 is rotatably driven from the lower end portion thereof where the root diameter of the screw is large so that it may increase the torque to be transmitted. But the trouble of deviation or wobbling of a cantilever screw is left unsolved. The disassembly or drawing of such long upright screw is troublesome. The construction of a vertical type of extruder of a large size is restricted by the building of plant. Moreover, the vertical extruder of FIG. 2 needs a special measure to seal a drive unit 15 from molten resin, since the drive unit is arranged at the side where the extrusion of the resin is carried out under pressure.

FIG. 3 further illustrate a conventional extruder including a screw 16 which is gradually decreased its root diameter toward either end from the center of the screw. this extruder is intended to feed resin from a pair of hoppers and to extrude molten, mixed resin from a center nozzle. The screw 16 is rotatably borne at both ends, but the drive is from the screw end where the root diameter is reduced to a minimum and obviously the material strength is lowered.

An object of the present invention is, therefore, to provide an improved extruder which overcomes the drawbacks and disadvantages mentioned above.

The novel features, organization and method of operation, together with further objects and advantages of the invention will be better understood from the following description in connection with the accompanying drawings, wherein;

FIGS. 1 to 3 schematically shows three types of conventional extruders as previously explained as prior arts;

FIG. 4 shows, partly in section, an extruder embodying the invention;

FIG. 5 is an enlarged view of a screw incorporated into the extruder of FIG. 4;

FIGS. 6 and 7 are further enlarged fragmentary views of the screw of FIG. 5, respectively.

Figure 1:
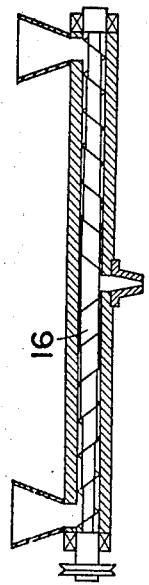
Figure 3:
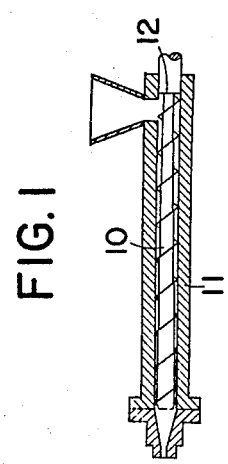
Figure 2:
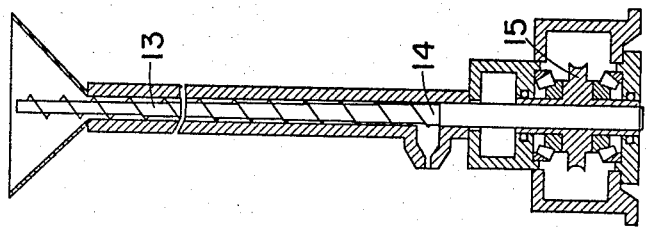

Now referring to FIG. 4, an extruder according to the invention includes a screw 21 rotatably extending through a barrel 22. On the right hand side in FIG. 4, the screw 21 is reduced its root diameter to a minimum and is supported by a bearing 23, while on the left hand side the screw shank 24 is held by a sleeve 25 which in turn is rotatably supported by bearings 26 and 27. A pulley 28 which is connected to a motor (not shown), is fixedly mounted on the outer end of the sleeve 25 for driving the screw 21. The numerical reference 29 is applied to a thrust bearing.

Resin or resinous compound from a hopper 30 is fed, at a predetermined rate of supply by means of a screw feeder 31, to the screw 21 in the barrel 22 at the portion where the root diameter of the screw 21 is reduced to a minimum, which portion being called a feed zone. The numerical references 32 and 33 indicate a motor and a change gear, respectively, for controlling the drive of the screw feeder 31. The barrel 22 is provided with heaters 34, cooling water inlets 35 and outlets 36 and thermocouples 37 for controlling the temperature of the barrel.

The screw 21 is formed to provide a feed zone 38, a compression zone 39 and a metering zone 40. The minimum root diameter of the screw 21 is set at the feed zone 38, while the maximum root diameter is at the metering zone 40. The resin is conveyed, heated and made molten or plasticized by the screw 21, and a predetermined amount of molten resin is forced and continously emerges from a die 41.

The screw 21 has, at the portion confronting with the port of die 41, a plurality of cross slits on the surface thereof for providing a zone 42 for mixing the molten resin before being fed into the die. Adjacent to this mixing zone 42, the screw 21 is further provided with a thread 43 running in the direction reverse to the thread of the screw 21. This reverse thread 43 serves to force back the molten resin toward the mixing zone 42, otherwise it may leak past the screw shank 24. The numerical references 44 and 45 are applied to an inlet and an outlet, respectively, of a suitable medium for controlling the temperature of the barrel 22 at a part where it carries the screw shank 24 so that the molten resin staying at the reverse thread 43 is kept at a proper temperature and that the amount of leakage of the molten resin is properly controlled. There is also provided a thread 46 on the screw 21 between the feed zone 38 and the bearing 23, same in direction but smaller in pitch with respect to the thread of the screw 21, so that the bearing 23 is protected from being contaminated by the material fed from the screw feeder 31.

The machine of FIG. 4 was manufactured for trial and operated with high-pressure polyethylene as a raw material. The trial machine showed that a screw of 35 mm. in diameter can drive to rotate at a rate of 1500 r.p.m. and it can yield a through put of 135 kg/h. If it is desired to obtain such high rate of extrusion with a conventional extruder under the limit of screw speed at 100 r.p.m., it will be necessary to use a screw of large diameter about 90 mm. to 100 mm. According to the present invention, however, it is unnecessary to use such a large-sized screw. The use of a conventional, relatively slender screw such as about 35 mm. in diameter can reduce the manufacturing cost of the machine to 1/3; on the other hand the high rate of running of the machine such as experimented above will improve the efficiency of the machine five times as high as the conventional machine.

Since the screw of the extruder according to the present invention is supported at both ends thereof and driving force is given to the screw from the larger side in root diameter, there is no fear of causing breakage of the screw by twisting or "biting" on the screw thread onto the barrel even if the screw is driven to rotate at high speed. In the present invention, the action of the screw onto the resinous material is draw rather than push. In this instance, the force acting on the screw is tension, which permits maximum utilization of the material strength. As is well known in the art, scrupulous kneading of the resinous material improves the physical properties of the products. Furthermore, the L/D ratio of the screws in conventional extruders has been increased to raise the compression ratio in an attempt to obtain a better product. the L/D ratio in the conventional screws, because they were of cantilever construction or driven from the smaller side in root diameter of the screw. According to the present invention, however, it is possible to increase the L/D ratio, since the screw is strengthened in construction. The screw of such a high L/D ratio can also be driven to rotate at high speed so that it improves the kneading effect of the resin. It should be also noted that little irregularity of the rate of supply of resinous material takes place owing to the drawing action of the screw according to the invention, coupled with its high speed rotation.

According to the invention, no deviation will occur in the screw during its high speed rotation, since it is supported at both ends. This means that it is possible to bore a hole, in the screw body, of a relatively large diameter said hole extending to the portion of the metering zone 40 so as to provide a temperature control chamber 47. Then the temperature of the molten resin immediately before entering the die 41 may be accurately measured by the use of a thermocouple 48 and, as occasion demands, a suitable heat medium may be introduced into the chamber 47 for raising or lowering the temperature of the molten resin. Such temperature controlling was quite impossible in the conventional cantilevered screws due to their deviation and under the limits of their material strength.

Figure 8:
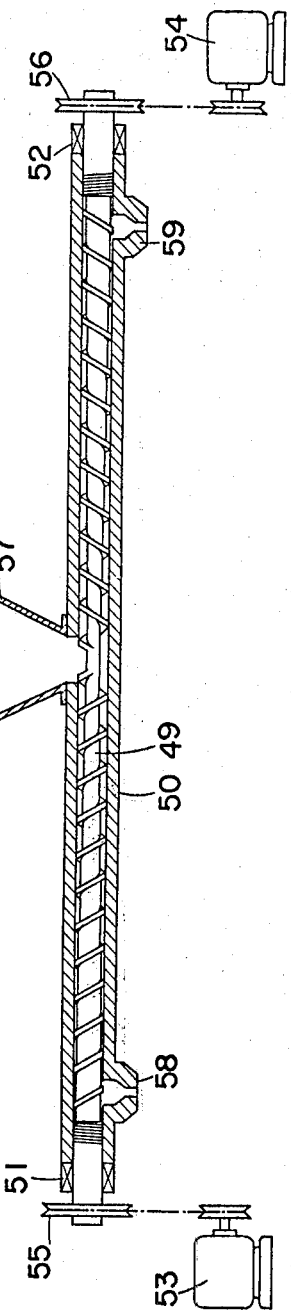
FIG. 8 schematically shows another embodiment of an extruder of the invention.

FIG. 8 shows a modification of the invention, wherein a screw 49 extends through a barrel 50 and is supported at both ends by bearings 51 and 52. The screw 49 is driven to rotate from both sides by means of synchronized motors 53 and 54 via pulleys 55 and 56, respectively. Resin or resinous compound is fed from a hopper 57 and discharged from a pair of dies 58 and 59. In this connection, the screw 49 is formed to provide at the center portion thereof a feed zone of minimum root diameter. The root diameter of the screw 49 gradually increases oppositely toward each end of the screw. The drive of the screw 49 is effected from the end with a larger in root diameter as shown.

I claim:

1. An extruder having an input port and an output port for the mixing and extrusion of plastics, comprising:
   a housing defining a cylindrical cavity therein;
   a tapered feed screw having first and second ends, said feed screw further having a first helical threading on a portion thereof, said tapered feed screw being positioned within said cylindrical cavity with each end being supported by bearings, said first end having a smaller root diameter and located adjacent said input port and said second end having a larger root diameter and located adjacent said output port;
   a mixing surface formed on said feed screw adjacent to said first helical threading and positioned adjacent to said output port; and
   a threaded sealing surface formed on said feed screw adjacent to said mixing surface near said outlet port such that said mixing surface is located on said feed screw between said first helical threading and said threaded sealing surface, said threaded sealing surface being a second helical threading opposite in inclination to said first helical threading,
   whereby said threaded sealing surface tends to prevent the further progress of said plastic along said housing as said tapered feed screw forces said plastic to be extruded out of said output port adjacent to said mixing surface.

2. The extruder of claim 1 wherein said feed screw has a single taper and is retained within said housing by a thrust bearing,
   whereby the stress on said feed screw is transmitted as a tensive rather than a compressive stress parallel to the longitudinal axis of said feed screw.

3. The extruder of claim 1 wherein:
   said tapered feed screw is rotatably driven at said end having said larger root diameter.

4. The extruder of claim 1 wherein:
   said feed screw defines a longitudinal cavity therein for the insertion of a means for injecting a heat exchanging fluid.

5. An extruder having an input port and an output port for the mixing and extrusion of plastics, comprising:
   a housing defining a cylindrical cavity therein;
   a tapered feed screw having two ends and a first helical threading on a portion thereof, said tapered feed screw being positioned within said cylindrical cavity, said feed screw having a longitudinal cavity therein for the insertion of a means for sensing temperature;
   a mixing surface formed on said feed screw adjacent to said first helical threading and positioned adjacent to said output port; and
   a threaded sealing surface formed on said feed screw adjacent to said mixing surface, said threaded sealing surface being a second helical threading opposite in inclination to said first helical threading,
   whereby said threaded sealing surface tends to prevent the further progress of said plastic along said housing as said tapered feed screw forces said plastic to be extruded out of said output port adjacent to said mixing surface.

6. The extruder of claim 5 further comprising:
   a mixing surface formed on said feed screw between each of said sealing surfaces and said adjacent first helical threadings, said mixing surface being in the proximity of one of said output ports; and
a driving means for rotating said feed screw, said driving means coupled to each of said ends of said feed screw.

7. An extruder having a central input port and two output ports for the extrusion of plastic, comprising:
a housing defining a central cavity therein;
a feed screw having first and second ends and being positioned within said cavity, said feed screw tapered toward its center and having two first helical threadings thereon of opposite inclination whereby said plastic introduced through said central input port is encouraged through said central input port toward each of said ends of said feed screw and is extruded out of said output ports, said first and second ends being supported by bearings whereby stress on each half of said feed screw is equally and oppositely directed so as to be substantially eliminated, said feed screw defining a longitudinal cavity therein for the insertion of a means for sensing temperature; and
a threaded sealing surface at each of said ends of said feed screw, said sealing surface being a second helical threading oppositely inclined as compared to said adjacent first helical threading, said threaded sealing surface positioned between said bearings retaining said feed screw in said housing and an adjacent output port.

* * * * *